Aug. 2, 1966 H. G. FEISSEL 3,264,617

SUPERCONDUCTOR MEMORY MATRIX

Filed Jan. 24, 1966 2 Sheets-Sheet 1

Inventor:
Henri Gerard Feissel
BY Baldwin & Wight
Attorneys

Aug. 2, 1966 H. G. FEISSEL 3,264,617

SUPERCONDUCTOR MEMORY MATRIX

Filed Jan. 24, 1966 2 Sheets-Sheet 2

Inventor:
Henri Gerard Feissel
BY Baldwin & Wight
Attorneys 3,264,617
Patented August 2, 1966

3,264,617

SUPERCONDUCTOR MEMORY MATRIX

Henri Gérard Feissel, Paris, France, assignor to Societe Industrielle Bull-General Electric (societe anonyme), Paris, France Filed Jan. 24, 1966, Ser. No. 522,438
Claims priority, application France, Feb. 18, 1965, 6,054
1 Claim. Cl. 340—173.1)

This invention relates to data storage devices utilising the phenomenon of superconduction which occurs in certain substances at very low temperature.

It is known that it is possible to utilise the phenomenon of superconduction in the manufacture of various devices, and more particularly of storage elements which can be advantageously employed in data-processing systems.

Thus, a number of types of storage elements comprising superconductors have been produced which have a number of interesting characteristics, more particularly very low energy consumption, high operating speed and extremely small dimensions. These elements can be made from appropriate substances disposed in thin layers which are readily obtained by printing, deposition or other techniques of integrated mass production.

The said storage elements also have other interesting characteristics including more particularly the existence of well-defined control thresholds. It is therefore possible to envisage the production of data storage devices of matrix structure which comprise a very large number of such storage elements and a system of selection by means of coincident currents. However, such devices can operate only if the control thresholds of all the storage elements which they comprise are identical or extremely similar. Now, the control thersholds in question are very sensitive to the differences in geometrical dimensions of the storage elements, so that when it is desired to obtain high capacities the construction of devices of the type under consideration involves the simultaneous deposition on a common support of a very large number of elements whose dimensions are very small and defined to within a few percent.

It has been possible to resolve certain problems of geometrical precision by using as the material support for persistent currents a continuous superconductive film common to all the storage elements. L. L. Burns, G. A. Alphonse and G. W. Leck have in fact shown in an article entitled "Coincident current superconductive memory" which appeared in I.R.E. Transactions on Electronic Computers, September 1961, that it is possible to generate localised persistent currents in a completely continuous superconductive film.

The invention concerns more particularly matrix stores comprising a completely continuous superconductive film, wherein the selecting conductors comprise parallel portions superimposed along the storage elements which they control.

It is known that in stores comprising such an arrangement of selecting conductors, the characteristics of the storage elements are influenced by the variations in the width of these superimposed parallel portions of the selecting conductors, and by the overlap defects of the said superimposed portions.

The invention has for its object to obviate this disadvantage and consequently to enable the recording devices under consideration to operate to some extent independently of certain imperfections of the techniques involved in the manufacture of these devices.

In short, this makes it possible to eliminate certain difficulties of manufacture and to increase the surface density of the devices under consideration.

To this end, the invention utilises the observations made by R. E. Fruin and V. L. Newhouse in the article entitled "A new crossed film cryotron structure with superimposed controls" which was published in Proc. IEEE, December 1963.

In this article, the authors show how the action on a superconductive sheet of coincident currents flowing in superimposed conductors in the superconductive state is influenced by the relative dimensions and positions of these conductors. More precisely, they show that if the conductor closest to the superconductive sheet is wider than the other conductors, this action is independent of the width of these other conductors and of their relative positions, provided that the latter do not project beyond the closest conductor. The devices according to the invention utilise both this observation and at the same time the discovery of the fact that the widest conductor must not necessarily be closest to the superconductive sheet.

The invention therefore concerns a device of matrix structure for storing numerical data, wherein there is employed as support for the recorded data a thin continuous superconductive sheet common to all the storage elements, and as the control system an electric circuit comprising superconductive line and column control conductors in ribbon form, which are deposited over one face of the superconductive sheet, each control conductor comprising a portion parallel to and superimposed upon a portion of a conductor which it crosses. In accordance with the invention, this device is characterised in that, at the crossing of two control conductors, the portions under consideration are of different widths, and in that the orthogonal projection of the narrowest one on to the plane of the sheet is entirely comprised within the projection of the other.

Owing to this arrangement, the sensitivity of the storage element does not depend upon the width of the narrowest portion under consideration, nor upon the position of this portion with respect to the other.

For a better understanding of the invention and to show how it may be carried into effect, the same will now be described, by way of example, with reference to the accompanying drawings, in which.

Figure 1:
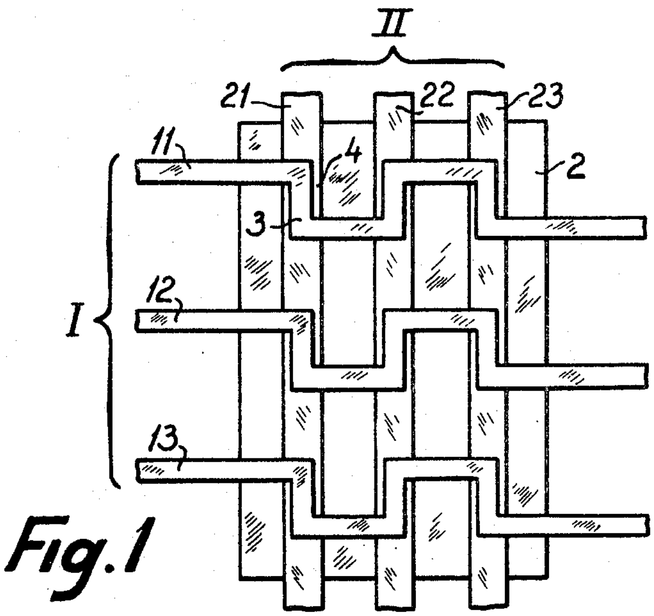
FIGURE 1 is a plan view of a storage device of matrix structure according to one embodiment of the invention.

The storage device illustrated in FIGURE 1 is a plane matrix store. This store comprises a continuous sheet 2 of a superconductive substance having a low critical field, such as tin, and control or selection conductors 11, 12, 13, 21, 22 and 23 in ribbon form deposited over one face of the continuous sheet 2. These control conductors form two series I and II, namely the line conductors 11, 12 and 13, and the column conductors 21, 22 and 23 respectively. They are made of a superconductive substance, such as lead, which has a relatively high critical field.

The conductors of each series extend transversely to those of the other series. For example, the line conductors extend parallel to the lines, while the column conductors extend parallel to the columns of the matrix.

Figure 2:
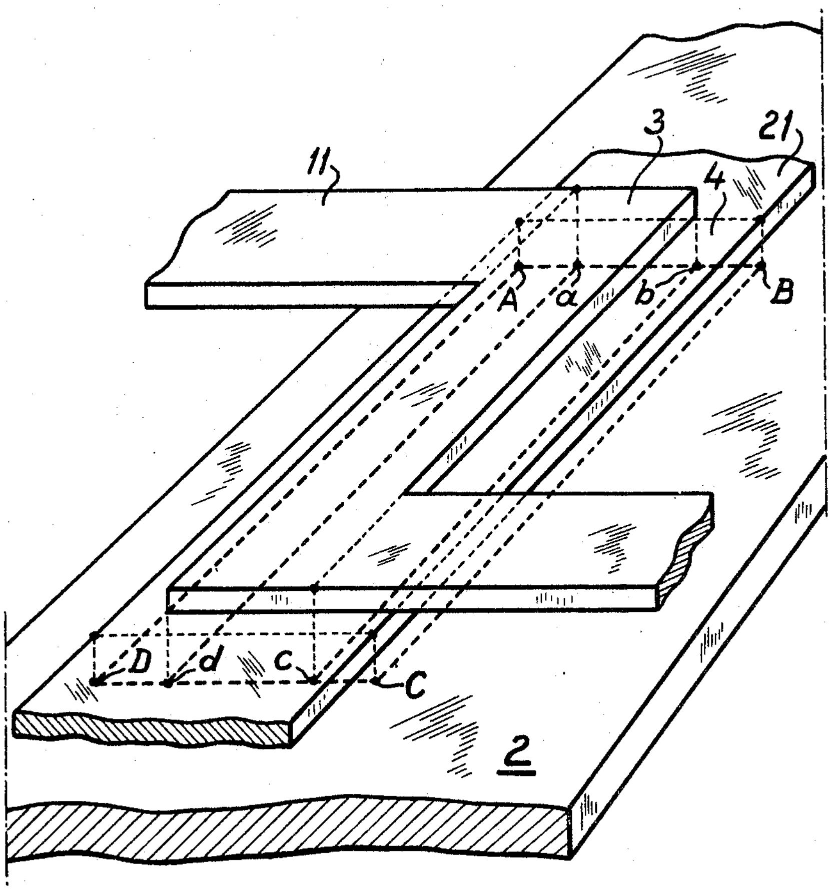
FIGURE 2 is a perspective view, drawn to a larger scale, of a storage element of the device illustrated in FIGURE 1.

The configuration of the control conductors, however, is such that two conductors of different series are parallel and superimposed over a short distance at their crossing point. For example, as will be seen in FIGURES 1 and 2, the portion 3 of the conductor 11 and the portion 4 of the conductor 21 are parallel and superimposed.

The conductor portions thus superimposed are of different widths and the narrowest does not project beyond the other. For example, the portion 3 of the conductor 11 is narrower than the portion 4 of the conductor 21, and the orthogonal projection abcd (FIGURE 2) of the portion 3 on to the plane of the continuous sheet 2 is entirely comprised within the orthogonal projection ABCD of the portion 4 on to the said plane.

The device just described constitutes only an example of an embodiment of the invention.

Figure 3:
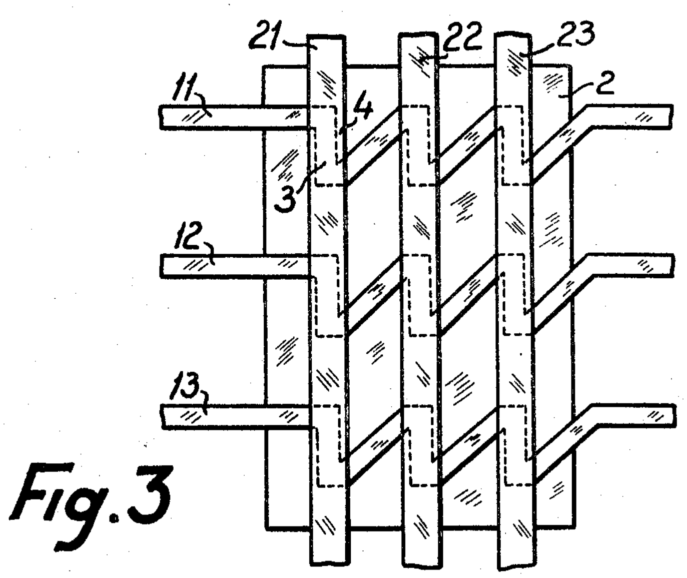
FIGURE 3 is a plan view of another embodiment of the invention.

FIGURE 3 illustrates by way of non-limiting example another embodiment of the invention. In this figure, the elements corresponding to those of the device previously described are denoted by the same reference characters.

What is claimed is:

A superconductor memory matrix comprising a data storage medium in the form of a continuous sheet of a superconductive material having a relatively low critical field, and two sets of selection conductors in the form of ribbon-like strips of a superconductive material having a relatively high critical field, both sets lying respectively in a first and a second plane parallel to the plane of said sheet and on the same side thereof, superposed portions of two strips pertaining to different ones of said two sets, being parallel to each other and having a different width, the wider one overlapping the narrower one on both sides, whereby the operation characteristics of a storage element of the memory matrix comprising two such superposed portions of strip depends neither on the width of the narrower portion nor on the position of the latter with respect to the larger portion.

No references cited.

BERNARD KONICK, *Primary Examiner*.

T. W. FEARS, *Assistant Examiner*.